United States Patent Office 3,390,217
Patented June 25, 1968

3,390,217
METHOD TO PREVENT WARPING OF HOT EMBOSSED DISK RECORDS BY PREHEATING THE CENTRAL ANNULUS
Alan Phillipson, Basil Harry Royston Spiller, Robin Smith, and Harry Cheesman, London, England, assignors to Decca Limited, London, England, a British company
Filed Sept. 11, 1964, Ser. No. 395,872
Claims priority, application Great Britain, Sept. 16, 1963, 36,305/63
8 Claims. (Cl. 264—107)

ABSTRACT OF THE DISCLOSURE

A gramophone record making process in which blank preformed discs made by injection moulding are embossed with required sound tracks by heated dies. To combat the effects of warping due to differential heating of a disc by the dies only the central region of a disc is preheated before embossing. The region immediately round the central hole in the disc as well as the outer annulus thereof can be shielded from the preheating.

---

This invention relates to the manufacture of gramophone records and, according to this invention, in a method of making a gramophone record in which a blank pre-formed disc, that is to say a disc of the required size and shape but without any sound track, is embossed with the requisite sound track by pressing between heated dies, at least a substantial portion of the central region of the disc is heated before the disc is embossed.

The region of the disc immediately surrounding the centre of the disc is preferably shielded from the heating, and preferably the disc is shielded from the heating over its outer annulus, that is the region on which the sound track is to be embossed.

The invention includes within its scope gramophone record making apparatus comprising a press having dies adapted to be heated for embossing a sound track on to a blank pre-formed disc, feed for means automatically feeding blank discs into the press and heating means for heating at least a substantial portion of the central region of each disc before it is fed by the feed means into the press. Shield means are preferably provided for shielding from the heating means either the region immediately surrounding the centre of the disc or the outer annulus or both. The heating means may comprise a radio-frequency heater or radiant heater, such as tungsten iodine lamps.

Figure 1:
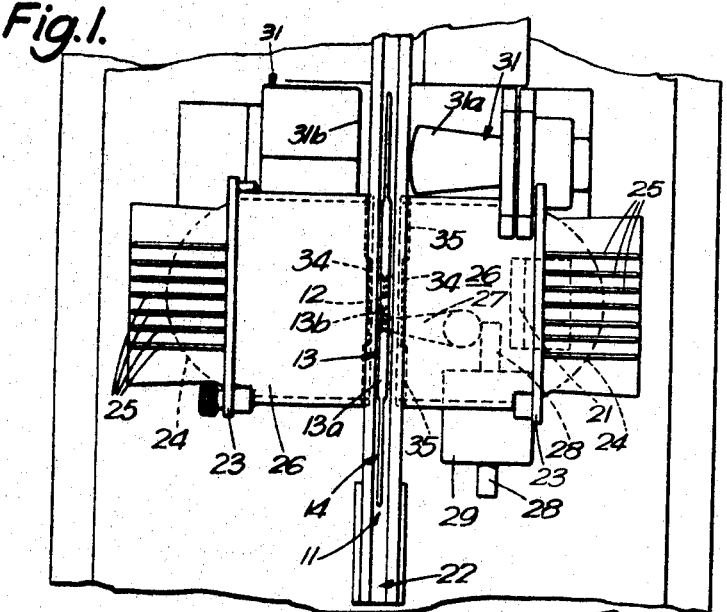
Figure 2:
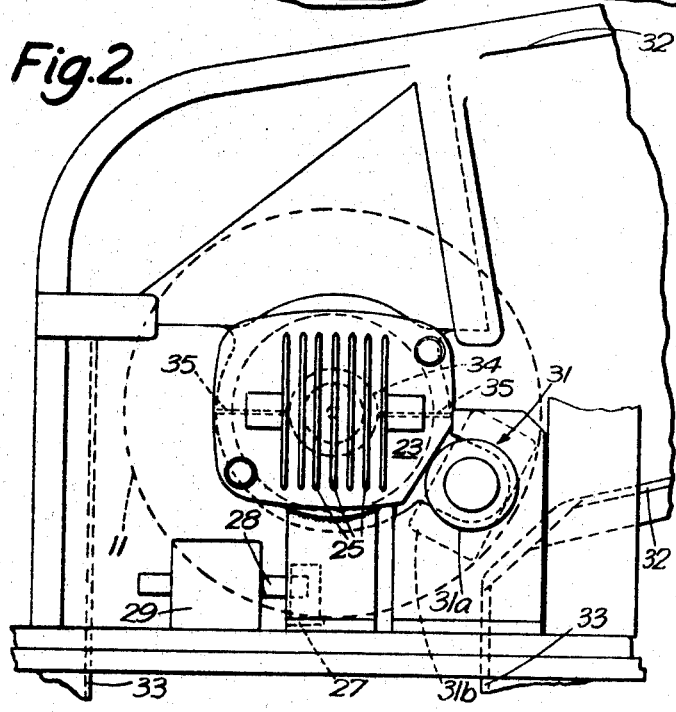

An example of the invention will now be described with reference to the accompanying drawings, in which:

FIGURE 1 is a plan view of a heating station of a gramophone record making apparatus with its top cover removed; and FIGURE 2 is a side elevation of the station of FIGURE 1 with its top cover in place.

The example of the invention is used in the manufacture of gramophone records by embossing the sound tracks on preformed discs 11. The discs 11 are formed, for example by injection moulding with a central hole 12, an inner annulus 13 around the hole and an outer annulus 14 around the inner annulus on which outer annulus the sound track is to be embossed. The inner annulus 13 is thicker than the outer annulus so that when records are stacked the sound tracks of adjacent records are not in contact. The shape of the disc is set out in British Standard Specification 1928 and in the International Electrical Technical Commission Publication 98/64.

The embossing operation may be carried out at a higher speed than the disc forming operation. As the demand for gramophone records is not steady throughout the year, it is convenient to use a few machines to preform discs steadily throughout the year for example by injection moulding and to store the discs ready for embossing at high speed when required.

When a pre-formed disc is to be embossed, it is removed from store and cleaned so that no contamination is pressed into the disc by the embossing dies.

The embossing dies are heated, and in order to prevent distortion of the disc as might occur when the outer annulus is heated in the dies while the inner annulus remains cool, the inner annulus is pre-heated immediately before the outer annulus is embossed.

After embossing, the record disc is labelled and packed. Conveniently the disc passes from one operation to another by rolling or sliding down chutes.

The station for heating the centre of the disc has two 325 watt tungsten-iodine lamps 21 mounted one on each side of a slot 22 for the disc 11. The lamps 21 are mounted in a holder 23 having a reflective 24 for directing the radiant energy of the lamp towards the disc slot 22, cooling fins 25 for cooling the holder 23, and a cylindrical hood 26 extending to the edge of the slot 22. The hood 26 is of the same internal diameter as the inner annulus 13 of the disc 11.

A solenoid-operated latch 27 is mounted at the base of the disc slot 22 so that the disc 11 can be supported on the latch 27 to locate the disc in the requisite position between the lamps 21. The latch 27 is mounted on a rotatable spindle 28 passing through the solenoid. When the solenoid 29 is energised, the spindle 28 is rotated to retract the latch 27 from the disc slot 22. A lamp and photocell device 31 is mounted at one side of the lamps 21 so that the light from the lamp of the device 31 to the photocell is cut off by the outer annulus 14 of the disc when the disc is located in the requisite position between the lamps 21.

Provided that the lamp and photocell device 31 registers the absence of a disc in the heating station, a disc is rolled down a nylon tracked channel 32 at regular intervals into the disc slot 22 from above and to one side. The discs is retained in the slot 22 by the latch 27 protruding into the bottom of the slot under the rim of the disc as shown in FIGURE 2.

The lamps 21 are continuously energised and direct radiant energy on to the outer part 13a of the inner annulus 13 of the disc. The outer annulus 14 is shielded by the hood 26 and the inner part 13b of the inner annulus 13 surrounding the spindle hole 12 is shielded by a disc shield 34 mounted on spokes 35. This inner part 13b is left unheated as it has been found that the spindle hole 12 can be distorted by the heat from the lamps 21.

After the heating period (a typical period is one second) the solenoid 29 is energized, the latch 27 is withdrawn from the slot 22 and the disc 11 is dropped between grooved nylon guides 33 to the record cleaning station (not shown) and subsequently to the embossing station (not shown), both stations being located vertically below the heating station.

Should the lamp and photocell device 31 register the presence of a disc in the heating station for longer than a predetermined period, the device 31 is arranged to switch off the lamps 21 so that should a disc become jammed between the lamps it will not be heated to melting point.

We claim:

1. A method of making a gramophone record in which a blank pre-formed disc, that is to say a disc of the required size and shape but without any sound track, is embossed with the requisite sound track by pressing between heated dies, wherein at least a substantial portion of the central region only of the disc is heated before the disc is embossed.

2. A method as claimed in claim 1 comprising shielding the region of the discs immediately surrounding the centre of the disc while heating the remainder of the central region of the disc.

3. A method as claimed in claim 1 comprising shielding from heating the outer annulus of the disc, that is to say the region of the disc on which the sound track is to be embossed and which lies outside the said central region.

4. In a method of making a gramophone record comprising embossing a blank preformed disc with the requisite sound tracks by pressing between heated dies, the improvement which comprises heating the central region of the disc before the disc is embossed to prevent warping of the disc due to the heating of the outer annulus in the dies while the inner central region remains cool.

5. A method of making gramophone records one at a time in succession, comprising the steps of automatically feeding one blank preformed disc at a time to a preheating means, preheating a substantial part of the central region only of each disc by said preheating means, removing each disc from said preheating means and embossing sound tracks on each preheated disc successively by pressing each disc in succession between a pair of heated dies.

6. A method as claimed in claim 5 comprising shielding from preheating the outer annulus of each disc.

7. A method of making a gramophone record comprising the steps of: injection moulding a blank disc of the required shape, the disc having a central hole, an inner annulus around the hole and an outer annulus for receiving sound tracks; preheating said inner annulus while shielding the central hole and said outer annulus from the preheating; and embossing sound tracks on the outer annulus by pressing the preheated disc between heated dies.

8. A method of making a plurality of gramophone records, comprising the steps of: injection moulding a plurality of blank discs of the required shape, the discs each having a central hole, an inner annulus, and an outer annulus for receiving sound tracks; storing said discs in a store; removing said discs from the store and feeding the discs thus removed to a preheating means one at a time in succession; preheating at least a substantial portion of the inner annulus only of each disc in said preheating means; automatically feeding each disc from said preheating means to an operation position in an embossing press, said press having a pair of heated dies; and embossing each disc with sound tracks by means of said pair of heated dies.

References Cited
UNITED STATES PATENTS 3,000,057    9/1961    Swedlow et al. _____ 264—230
3,143,198    8/1964    Alexander _____ 264—107

JAMES A. SEIDLECK, *Primary Examiner.*

ALEXANDER H. BRODMERKEL, *Examiner.*

A. H. KOECKERT, *Assistant Examiner.*